(12) United States Patent
Lien et al.

(10) Patent No.: US 8,199,257 B2
(45) Date of Patent: Jun. 12, 2012

(54) VIDEO FILTER AND VIDEO PROCESSOR AND PROCESSING METHOD USING THE SAME

(75) Inventors: Chun-Hung Lien, Taipei (TW); Dong-Yang Lin, Taipei County (TW)

(73) Assignee: Novatek Microelectronics Corp., Hsinchu (TW)

(*) Notice: Subject to any disclaimer, the term of this patent is extended or adjusted under 35 U.S.C. 154(b) by 770 days.

(21) Appl. No.: 12/392,305

(22) Filed: Feb. 25, 2009

(65) Prior Publication Data

US 2009/0153741 A1    Jun. 18, 2009

(30) Foreign Application Priority Data

Oct. 31, 2008   (TW) ................ 97142201 A (51) Int. Cl.
*H04N 5/57* (2006.01)

(52) U.S. Cl. ........ 348/687; 348/688; 348/674; 348/625; 348/607; 348/678; 382/266; 382/260; 382/264; 382/274

(58) Field of Classification Search ............... None
See application file for complete search history.

(56) References Cited

U.S. PATENT DOCUMENTS

| 7,821,579 B2 * | 10/2010 | Lin et al. .................. 348/607 |
| 7,840,089 B2 | 11/2010 | Ho |
| 7,952,647 B2 | 5/2011 | Chiu |
| 2007/0019112 A1 * | 1/2007 | Kim .................. 348/646 |
| 2007/0171310 A1 * | 7/2007 | Arici et al. ............. 348/687 |
| 2008/0107335 A1 | 5/2008 | Chao et al. |
| 2011/0170010 A1 | 7/2011 | Chiu |

FOREIGN PATENT DOCUMENTS

| TW | 476222 B | 2/2002 |
| TW | 200820742 A | 5/2008 |
| TW | 200822709 A | 5/2008 |
| TW | 200834469 A | 8/2008 |

* cited by examiner

*Primary Examiner* — Jefferey Harold
*Assistant Examiner* — Omer Khalid
(74) *Attorney, Agent, or Firm* — Rabin & Berdo, P.C.

(57) ABSTRACT

A video processor includes a video filter and a calculation circuit. The video filter performs a low-pass filtering operation on first frame data to obtain brightness distribution data. The calculation circuit obtains difference data between the brightness distribution data and second frame data. The calculation circuit multiplies the difference data and a weighting parameter together to obtain a product, and then summates the product and the second frame data together to generate processed frame data.

22 Claims, 4 Drawing Sheets

VIDEO FILTER AND VIDEO PROCESSOR AND PROCESSING METHOD USING THE SAME

This application claims the benefit of Taiwan application Serial No. 97142201, filed Oct. 31, 2008, the subject matter of which is incorporated herein by reference.

BACKGROUND OF THE INVENTION

1. Field of the Invention

The invention relates to a video processor, and more particularly to a video processor for enhancing the contrast display effect and the video sharpness of a displayed frame.

2. Description of the Related Art

In the current technology, an analog signal of television video data is transmitted via a cable, such as a coaxial cable. Generally speaking, the signal quality of the analog television signal relates to the signal compression degree. In some operation conditions, the analog television signal has the problems that the signal quality is poor and the contrast display effect and the video sharpness of the displayed frame are poor.

Figure 1:
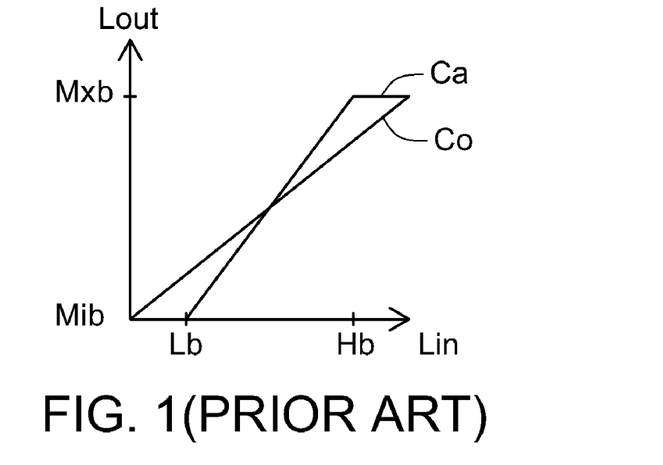
FIG. 1 (Prior Art) is a schematic illustration showing conventional video adjustment curves.

In the current technology, the technology of adjusting the pixel data according to a brightness adjusting curve has been disclosed. FIG. 1 (Prior Art) is a schematic illustration showing conventional video adjustment curves. As shown in FIG. 1, the brightness of the pixel data having the higher brightness in the frame data can be enhanced, and the brightness of the pixel data having the lower brightness in the frame data can be correspondingly lowered according to the curve Ca. Consequently, the contrast display effect and the video sharpness of the video frame in the conventional analog television can be enhanced.

In the prior art, however, the input pixel data having the brightness higher than or equal to the brightness Hb is correspondingly displayed as the maximum brightness Mxb. Similarly, the input pixel data having the brightness lower than or equal to the brightness Lb is correspondingly displayed as the minimum brightness Mib. Thus, the displayed frame is seriously distorted. In addition, the prior art only can perform the single and full-region adjustment on the displayed frame, and cannot perform the corresponding adjustment on each of the regions in the displayed frame.

SUMMARY OF THE INVENTION

The invention is directed to a video processor for finding the brightness distribution data corresponding to each region of the displayed video through a low-pass filter, and then finding the data corresponding to the graphic boundary in the displayed video according to the difference between the brightness distribution data and frame data in order to enhance the display contrast effect and the video sharpness of the displayed video. Consequently, compared to the conventional video processor, the video processor of this embodiment has the advantages that the lower distortion degree of the displayed frame can be obtained, and that different adjustment operations can be performed on each region in the displayed video.

According to a first aspect of the present invention, a video processor including a video filter and a calculation circuit is provided. The video filter performs a low-pass filtering operation on first frame data to obtain brightness distribution data. The first frame data includes X×Y pixel data, and X and Y are natural numbers greater than 1. The calculation circuit obtains difference data between the brightness distribution data and second frame data, multiplies the difference data and a weighting parameter together to obtain a product, and then summates the product and the second frame data together to generate processed frame data.

According to a second aspect of the present invention, a video processing method is provided. The method includes the following steps. First, a low-pass filtering operation is performed on first frame data to obtain brightness distribution data, wherein the first frame data comprises X×Y pixel data, and X and Y are natural numbers greater than 1. Next, difference data between the brightness distribution data and second frame data is calculated. Then, the difference data and a weighting parameter are multiplied together to obtain a product, and then the product and the second frame data are summated together to generate processed frame data.

According to a third aspect of the present invention, a video filter for performing a low-pass filtering operation on first frame data is provided. The first frame data includes X×Y pixel data, wherein X and Y are natural numbers greater than 1. The video filter includes a storage circuit and a first processor circuit. The storage circuit stores a plurality of low-pass filter values. The first processor circuit loads the low-pass filter values and forms, according to the low-pass filter values, a window for performing filtering allocation on each of the X×Y pixel data to correspondingly obtain X×Y filtered average pixel data. The first processor circuit outputs the X×Y filtered average pixel data as brightness distribution data.

According to a fourth aspect of the present invention, a video filter for performing a low-pass filtering operation on first frame data is provided. The first frame data includes X×Y pixel data, wherein X and Y are natural numbers greater than 1. The video filter includes a data compression circuit, a storage circuit, a first processor circuit and a data reproducing circuit. The data compression circuit arranges the first frame data into M×N video sections according to a unit width value and a unit height value. The M×N video sections corresponds to respective M×N sampling pixel data, X and Y are natural numbers greater than 1, and M and N are a natural number smaller than X and greater than 1 and a natural number smaller than Y and greater than 1, respectively. The storage circuit stores a plurality of low-pass filter values. The first processor circuit loads the low-pass filter values and forms, according to the low-pass filter values, a window for performing filtering allocation on each of the M×N sampling pixel data to correspondingly obtain M×N filtered average pixel data. The data reproducing circuit reproduces the M×N filtered average pixel data to obtain X×Y processed pixel data, and outputs the X×Y processed pixel data as brightness distribution data.

The invention will become apparent from the following detailed description of the preferred but non-limiting embodiments. The following description is made with reference to the accompanying drawings.

DETAILED DESCRIPTION OF THE INVENTION

The embodiment proposes a video processor, which includes a video filter and a calculation circuit. The video filter performs a low-pass filtering operation on first frame data to obtain brightness distribution data. The first frame data includes X×Y pixel data, wherein X and Y are natural numbers greater than 1. The calculation circuit calculates difference data between the brightness distribution data and second frame data. The calculation circuit modifies a weighting between the difference data and the second frame data according to a weighting parameter, and then summates the modified product and the modified second frame data together to generate processed frame data.

Figure 2:
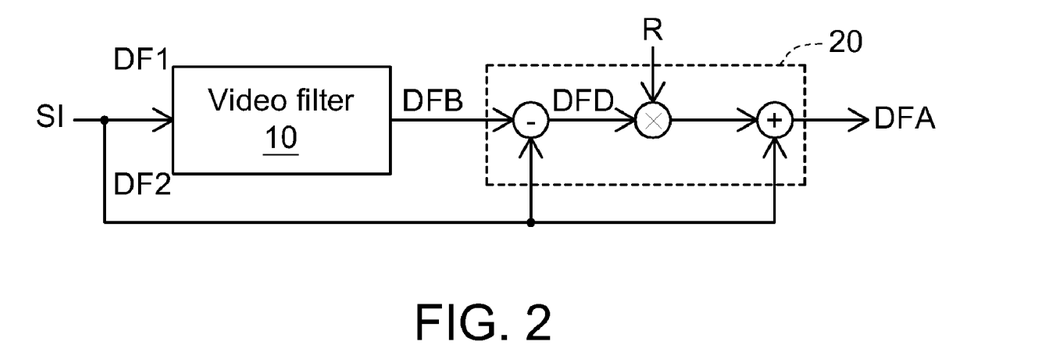
FIG. 2 is a block diagram showing a video processor according to an embodiment of the invention.

FIG. 2 is a block diagram showing a video processor 1 according to an embodiment of the invention. As shown in FIG. 2, the video processor 1 is applied to a display (not shown) and is for adjusting input video data SI received thereby. For example, the input video data SI includes several video frame data. In this illustrated embodiment, the video processor 1 performs an operation on frame data DF1 and DF2. Each frame data of the input video data SI includes X×Y pixel data, wherein X and Y are natural numbers greater than 1.

In one example, a color space used by each of the pixel data of the frame data DF1 and DF2 has component corresponding to brightness, and the video processor 1 adjusts the component corresponding to brightness in each pixel data. For example, each pixel data of the frame data DF1 and DF2 uses a YUV color space, and the video processor 1 of this embodiment adjusts the data Y. In other examples, each pixel data of the frame data DF1 and DF2 may also use other color spaces, such as a HSI color space and a HSV color space, having component corresponding to brightness.

The video processor 1 includes a video filter 10 and a calculation circuit 20. The video filter 10 is for performing the low-pass filtering operation on the frame data DF1 to obtain brightness distribution data DFB.

Figure 3:
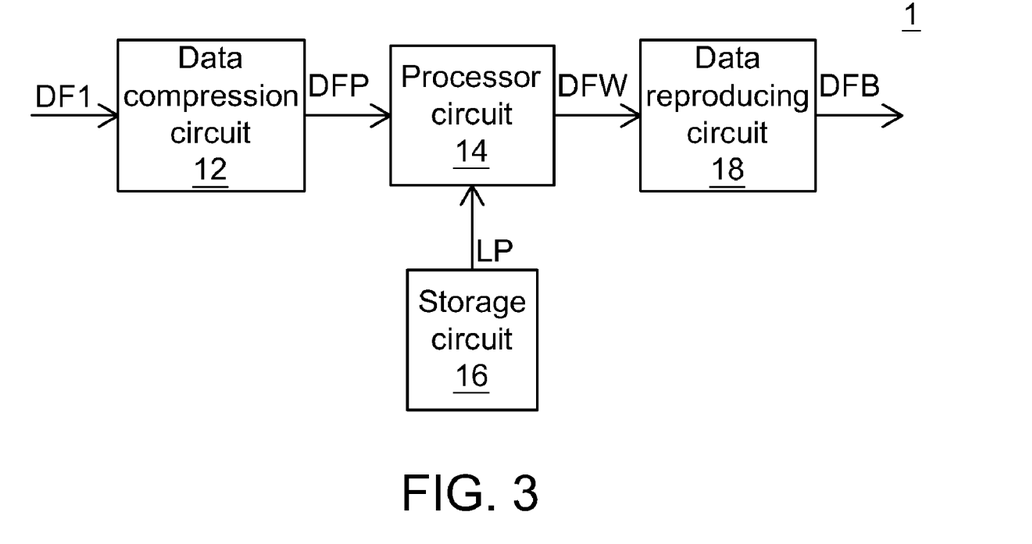
FIG. 3 is a detailed block diagram showing a video filter 10 of FIG. 2.
Figure 4:
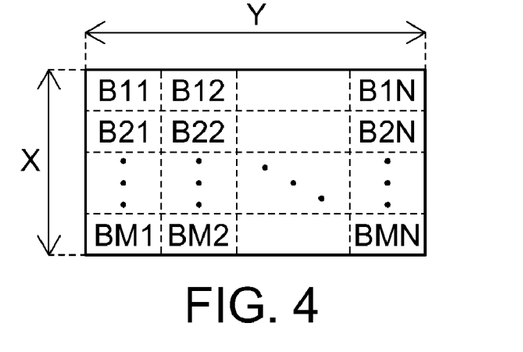
FIG. 4 is a schematic illustration showing video sections B11 to BMN.

FIG. 3 is a detailed block diagram showing the video filter 10 of FIG. 2. Referring to one example in FIG. 3, the video filter 10 includes a data compression circuit 12, a processor circuit 14, a storage circuit 16 and a data reproducing circuit 18. The data compression circuit 12 arranges the frame data DF1 into M×N video sections B11, B12, . . . , B1N, B21, B22, . . . , BMN according to a unit width value X/M and a unit height value Y/N, as shown in FIG. 4, wherein M and N are a natural number smaller than X and greater than 1 and a natural number smaller than Y and greater than 1, respectively.

In one example, X and Y are respectively equal to 600 and 800, and the unit width value X/M and the unit height value Y/N are equal to 10. Consequently, M and N are respectively equal to 60 and 80, and each video section includes 100 pixel data.

Figure 5:
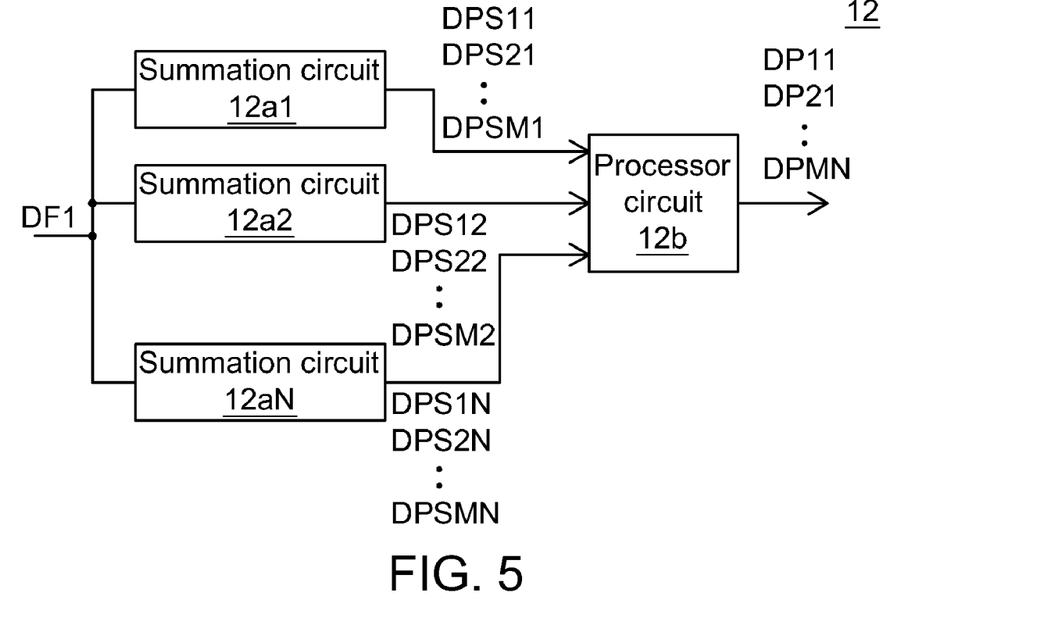
FIG. 5 is a detailed block diagram showing a data compression circuit 12 of FIG. 3.

The video sections B11 to BMN respectively have sampling pixel data DP11 to DPMN, for example. FIG. 5 is a detailed block diagram showing the data compression circuit 12 of FIG. 3. In one example, as shown in FIG. 5, the data compression circuit 12 includes N summation circuits $12a1$ to $12aN$ corresponding to N video section columns of the M×N video sections and a processor circuit $12b$. The summation circuits $12a1$ to $12aN$ sum pixel data within the respective N video sections on each of the M video section rows to obtain M×N summation video data.

For example, when vertical video positions of the pixel data range from 0 to X/M, and horizontal video positions of the pixel data respectively range from 0 to Y/N, from Y/N+1 to 2Y/N, from 2Y/N+1 to 3Y/N, . . . , and from (N−1)Y/N to Y, the summation circuits $12a1$ to $12aN$ are correspondingly enabled to summate all the pixel data within the respective video sections B11 to B1N to respectively obtain summation video data DPS11 to DPS1N. The processor circuit $12b$ obtains sampling pixel data DP11 to DP1N respectively corresponding to the video sections B11 to B1N according to the summation video data DPS11 to DPS1N and the pixel data quantity contained in each of the video sections B11 to B1N.

At the vertical video positions of other pixel data, the summation circuits $12a1$ to $12aN$ and the processor circuit $12b$ also perform the similar operations to correspondingly obtain the sampling pixel data DP11 to DPMN respectively corresponding to the video sections B11 to BMN. The processor circuit $12b$ provides sampling frame data DFP, containing the sampling pixel data DP11 to DPMN, to the processor circuit 14.

The storage circuit 16 is for storing a plurality of low-pass filter values LP. The processor circuit 14 loads the low-pass filter values LP and forms, according to the low-pass filter values LP, a window for performing filtering allocation on each of the sampling pixel data DP11 to DPMN to correspondingly obtain filtered average pixel data DPW11 to DPWMN respectively corresponding to the video positions B11 to BMN. The storage circuit 16 also outputs filtered average frame data DFW including the filtered average pixel data DPW11 to DPWMN.

Figure 6:
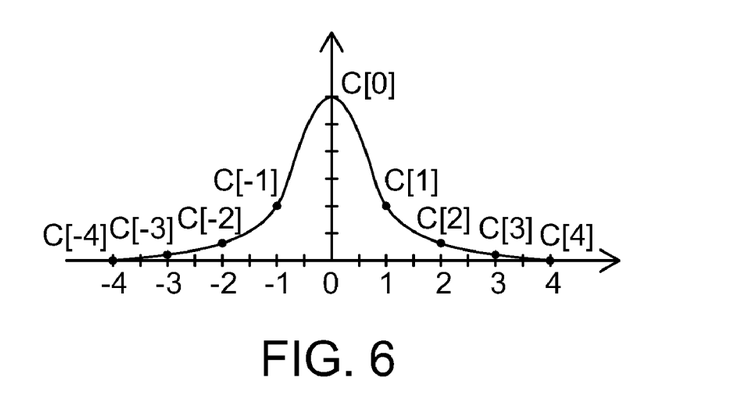
FIG. 6 shows a Gaussian distribution curve.
Figure 7:
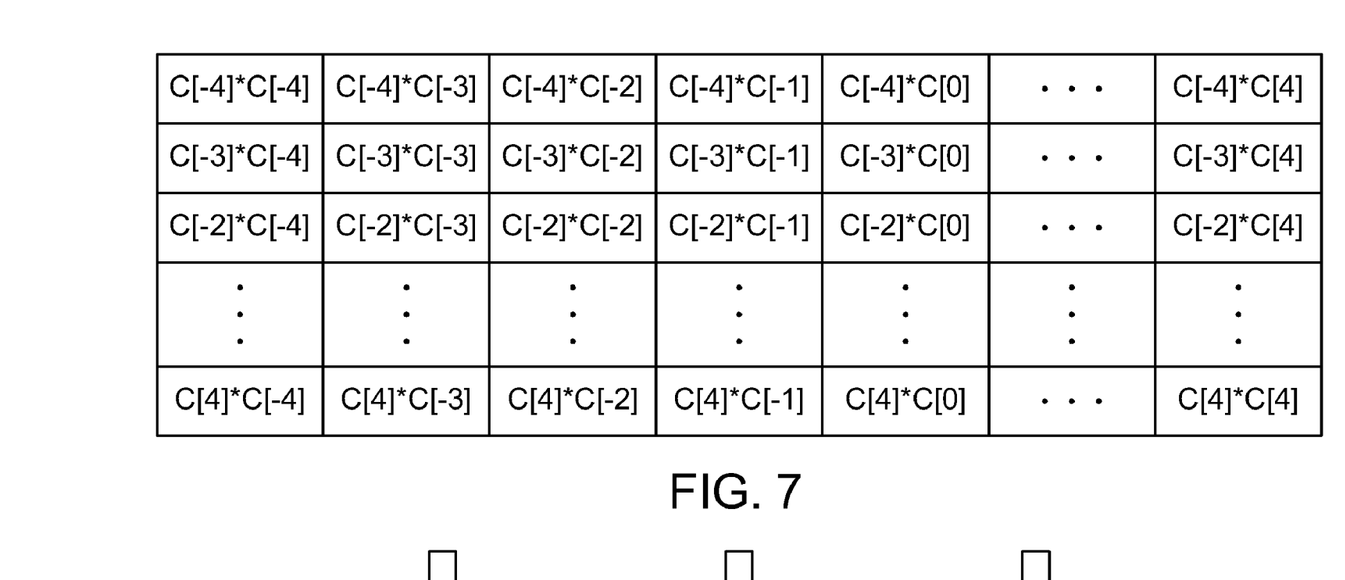
FIG. 7 is a schematic illustration showing a window.

In one example, the low-pass filter parameters may be obtained with reference to a Gaussian distribution curve, as shown in FIG. 6. When the vertical axis coordinates are equal to −4, −3, −2, −1, 0, 1, 2, 3 and 4, the Gaussian curve C correspondingly has the values C[−4], C[−3], C[−2], C[−1], C[0], C[1], C[2], C[3] and C[4], and the corresponding window is shown in FIG. 7.

For example, when the processor circuit 14 wants to calculate the weighting average pixel data DPW11 corresponding to the video section B11, the processor circuit 14 generates the following equation according to the window and the sampling pixel data selected by the window around the video section B11:

$$DPW11 = \frac{\sum_{Window} DP \times C_{window}}{\sum_{Window} C_{window}} = \frac{\sum_{i=0}^{4}\sum_{j=0}^{4} DPij \times \{C[i] \times C[j]\}}{\sum_{i=0}^{4}\sum_{j=0}^{4} C[i] \times C[j]}$$

Similarly, the operations for other filtered average pixel data DPW12 to DPWMN may be analogized according to the above-mentioned description.

The data reproducing circuit 18 reproduces the M×N filtered average pixel data DPW11 to DPWMN to obtain X×Y processed pixel data DPB11 to DPBXY, and outputs the processed pixel data DPB11 to DPBMN as the brightness distribution data DFB. In one example, the data reproducing circuit 18 generates the processed pixel data DPB11 to DPBXY according to the filtered average pixel data DPW11 to DPWMN by way of bilinear interpolation.

The calculation circuit 20 generates difference data DFD, which is substantially the edge information of each video block on the frame data DF1, according to the difference between the frame data DF2 and the brightness distribution data DFB. The calculation circuit 20 further multiplies the difference data DFD and a weighting parameter R together to obtain a product, and then summates the product and the frame data DF2 together to generate processed frame data DFA for output.

Figure 8:
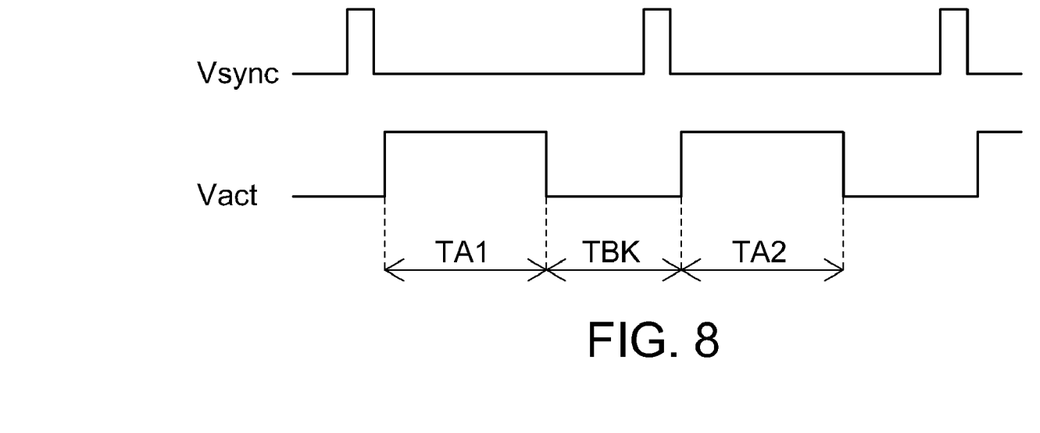
FIG. 8 is a timing chart showing associated signals for a display of the video processor according to the embodiment of the invention.

In one example, the frame data DF1 and DF2 respectively correspond to the $k^{th}$ video frame and the $(k+1)^{th}$ video frame of the input video data SI. For example, the video processor 1 generates the processed frame data DPA in a blanking period TBK between a data transmission period TA1 for receiving the $k^{th}$ video frame data and a data transmission period TA2 for receiving the $(k+1)^{th}$ video frame data, as shown in FIG. 8. The signal Vsync is a frame synchronization signal, and the signal Vact is a frame active signal.

Figure 9:
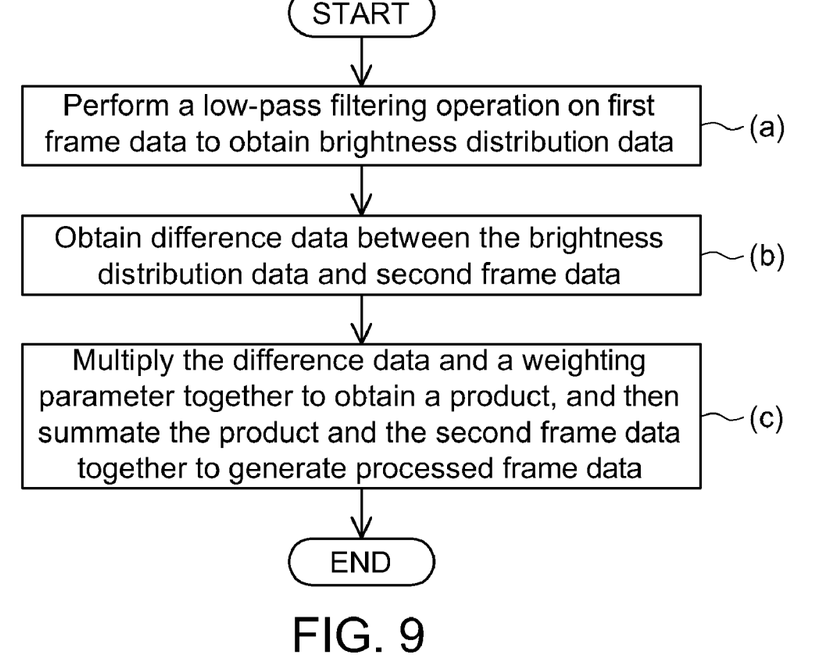
FIG. 9 is a flow chart showing a video processing method according to the embodiment of the invention.

FIG. 9 is a flow chart showing a video processing method according to the embodiment of the invention. First, as shown in step (a), the video filter 10 performs the low-pass filtering operation on the frame data DF1 to obtain the brightness distribution data DFB. Next, as shown in step (b), the calculation circuit 20 calculates the difference data DFD between the brightness distribution data DFB and the frame data DF2. Then, as shown in step (c), the calculation circuit 20 multiplies the difference data DFD by the weighting parameter R to obtain the product, and then summates the product and the second frame data together to generate the processed frame data DFA.

Figure 10:
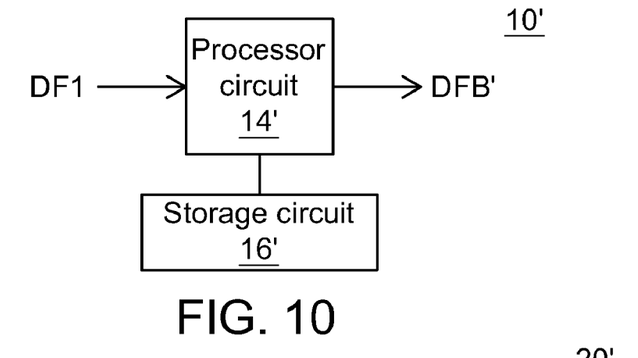
FIG. 10 is another detailed block diagram showing the video filter according to the embodiment of the invention.

In this illustrated embodiment, the video filter 10 uses the data compression circuit 12 to compress the X×Y pixel data in the frame data DF1 into M×N sampling pixel data DP11 to DPMN and then perform the window filtering coefficient summation. However, the video filter 10 of this embodiment is not limited thereto. In another example, the data compression circuit 12 and the data reproducing circuit 18 are omitted from the video filter 10', and the frame data DF1 is directly provided to the processor circuit 14' to perform the window filtering coefficient summation, as shown in FIG. 10.

Figure 11:
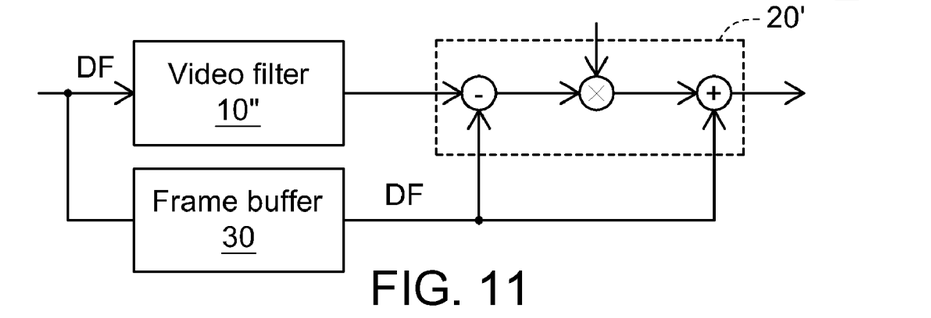
FIG. 11 is another block diagram showing the video processor according to the embodiment of the invention.

In this illustrated embodiment, the frame data DF1 and DF2 respectively correspond to the $k^{th}$ video frame and the $(k+1)^{th}$ video frame of the input video data SI. However, the video filter 10 of this embodiment is not limited thereto. In another example, the frame data DF1 and DF2 correspond to the same video frame. In this example, the video processor 1' of this embodiment further has a frame buffer 30 for temporarily storing the frame data DF, as shown in FIG. 11. Consequently, the video filter 10" may generate the corresponding brightness distribution data DFB' according to the frame data DF' by way of calculation, and the calculation circuit 20' obtains the processed frame data DFA' according to the brightness distribution data DFB' and the frame data DF.

The video processor of this embodiment finds the brightness distribution data corresponding to each region of the displayed video through the low-pass filter. Then, the video processor finds the data corresponding to the graphic boundary in the displayed video according to the difference between the brightness distribution data and the frame data to enhance the display contrast effect and the video sharpness of the displayed video. Compared with the conventional video processor, the video processor of this embodiment has the advantage of the lower frame distortion degree.

In addition, the video processor of this embodiment can generate different brightness distribution data corresponding to the regions in the displayed video. Compared with the conventional video processor, the video processor of this embodiment further has the advantage of performing different adjustment operations corresponding to different regions in the displayed video.

Furthermore, the video filter in the video processor of this embodiment may reduce the data calculation loading of the processor circuit and enhance the data processing speed of the processor circuit through the data compression circuit. Consequently, the video processor of this embodiment may further effectively complete the operation of the processed frame data in the blanking period between two neighboring frame data transmission periods. Consequently, compared with the conventional video processor, the video processor of this embodiment further has the advantages that the frame buffer can be omitted and that the frame data may be processed in a real time manner.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video processor, comprising:
a video filter for performing a low-pass filtering operation on first frame data to obtain brightness distribution data, wherein the first frame data comprises X×Y pixel data, and X and Y are natural numbers greater than 1; and
a calculation circuit for obtaining difference data between the brightness distribution data and second frame data, wherein the calculation circuit modifies a weighting between the difference data and the second frame data according to a weighting parameter, and then summates the modified difference data and the modified second frame data together to generate processed frame data.

2. The video processor according to claim 1, wherein the video filter comprises:
a storage circuit for storing a plurality of low-pass filter values; and
a first processor circuit for loading the low-pass filter values and forming, according to the low-pass filter values, a window for performing filtering allocation on each of the X×Y pixel data to correspondingly obtain X×Y filtered average pixel data, wherein the first processor circuit outputs the X×Y filtered average pixel data as the brightness distribution data.

3. The video processor according to claim 1, wherein the video filter comprises:
a data compression circuit for arranging the first frame data into M×N video sections according to a unit width value and a unit height value, wherein the M×N video sections corresponds to respective M×N sampling pixel data, X and Y are natural numbers greater than 1, and M and N are a natural number smaller than X and greater than 1 and a natural number smaller than Y and greater than 1, respectively;
a storage circuit for storing a plurality of low-pass filter values;
a first processor circuit for loading the low-pass filter values and forming, according to the low-pass filter values, a window for performing filtering allocation on each of the M×N sampling pixel data to correspondingly obtain M×N filtered average pixel data; and a data reproducing circuit for reproducing the M×N filtered average pixel data to obtain X×Y processed pixel data, and for outputting the X×Y processed pixel data as the brightness distribution data.

4. The video processor according to claim 3, wherein the data compression circuit comprises:

N summation circuits respectively corresponding to N video section columns of the M×N video sections, wherein the N summation circuits sum pixel data within respective N video sections on each of the M video section rows to obtain M×N summation video data; and a second processor circuit for calculating the M×N sampling pixel data corresponding to the respective M×N video sections based on the M×N summation video data.

5. The video processor according to claim 1, wherein:

the first frame data and the second frame data respectively correspond to a $k^{th}$ video frame and a $(k+1)^{th}$ video frame of input video, and k is a natural number; and the video processor generating the processed frame data in a blanking period between a data transmission period for receiving the $k^{th}$ video frame and a data transmission period for receiving the $(k+1)^{th}$ video frame.

6. The video processor according to claim 1, wherein the first frame data and the second frame data correspond to a $k^{th}$ video frame of input video, and k is a natural number.

7. The video processor according to claim 1, wherein each of the pixel data in the first frame data and the second frame data comprises a component corresponding to brightness.

8. The video processor according to claim 1, wherein the video filter is a Gaussian filter.

9. A video processing method, comprising:

performing a low-pass filtering operation on first frame data to obtain brightness distribution data, wherein the first frame data comprises X×Y pixel data, and X and Y are natural numbers greater than 1;

calculating difference data between the brightness distribution data and second frame data; and multiplying the difference data and a weighting parameter together to obtain a product, and then summating the product and the second frame data together to generate processed frame data.

10. The method according to claim 9, wherein the step of performing the low-pass filtering operation on the first frame data comprises the sub-steps of:

loading a plurality of low-pass filter values from a storage circuit;

forming, according to the low-pass filter values, a window for performing weighting allocation on each of the X×Y pixel data to correspondingly obtain X×Y filtered average pixel data; and outputting the X×Y filtered average pixel data as the brightness distribution data.

11. The method according to claim 9, wherein the step of performing the low-pass filtering operation on the first frame data comprises the sub-steps of:

dividing the first frame data into M×N video sections according to a unit width value and a unit height value, wherein the M×N video sections corresponds to respective M×N sampling pixel data, X and Y are natural numbers greater than 1, and M and N are respectively a natural number smaller than X and greater than 1 and a natural number smaller than Y and greater than 1;

loading a plurality of low-pass filter values from a storage circuit;

forming, according to the low-pass filter values, a window for performing filtering allocation on each of the M×N sampling pixel data to correspondingly obtain M×N filtered average pixel data; and reproducing the M×N filtered average pixel data to obtain X×Y processed pixel data and outputting the X×Y processed pixel data as the brightness distribution data.

12. The method according to claim 11, wherein the sub-step of arranging the first frame data into the M×N video sections comprises:

summating the pixel data respectively corresponding to the M×N video sections together to corresponding generate M×N summation video data; and calculating the M×N sampling pixel data corresponding to the respective M×N video sections based on the M×N summation video data.

13. The method according to claim 9, wherein:

the first frame data and the second frame data respectively correspond to a $k^{th}$ video frame and a $(k+1)^{th}$ video frame of input video, and k is a natural number; and the video processing method generates the processed frame data in a blanking period between a data transmission period for receiving the $k^{th}$ video frame and a data transmission period for receiving the $(k+1)^{th}$ video frame.

14. The method according to claim 9, wherein the first frame data and the second frame data correspond to a $k^{th}$ video frame of input video, and k is a natural number.

15. The method according to claim 9, wherein each of the pixel data in the first frame data and the second frame data comprises a component corresponding to brightness.

16. A video filter for performing a low-pass filtering operation on first frame data, which comprises X×Y pixel data, wherein X and Y are natural numbers greater than 1, the video filter comprising:

a storage circuit for storing a plurality of low-pass filter values; and a first processor circuit for loading the low-pass filter values and forming, according to the low-pass filter values, a window for performing filtering allocation on each of the X×Y pixel data to correspondingly obtain X×Y filtered average pixel data, wherein the first processor circuit outputs the X×Y filtered average pixel data as brightness distribution data.

17. The video filter according to claim 16, wherein each of the pixel data in the first frame data comprises a component corresponding to brightness.

18. The video filter according to claim 16, wherein the video filter is a Gaussian filter.

19. A video filter for performing a low-pass filtering operation on first frame data, which comprises X×Y pixel data, wherein X and Y are natural numbers greater than 1, the video filter comprising:

a data compression circuit for arranging the first frame data into M×N video sections according to a unit width value and a unit height value, wherein the M×N video sections corresponds to respective M×N sampling pixel data, X and Y are natural numbers greater than 1, and M and N are a natural number smaller than X and greater than 1 and a natural number smaller than Y and greater than 1, respectively;

a storage circuit for storing a plurality of low-pass filter values;

a first processor circuit for loading the low-pass filter values and forming, according to the low-pass filter values, a window for performing filtering allocation on each of the M×N sampling pixel data to correspondingly obtain M×N filtered average pixel data; and a data reproducing circuit for reproducing the M×N filtered average pixel data to obtain X×Y processed pixel data, and for outputting the X×Y processed pixel data as brightness distribution data.

20. The video filter according to claim 19, wherein the data compression circuit comprises:

N summation circuits respectively corresponding to N video section columns of the M×N video sections, wherein the N summation circuits sum pixel data within respective N video sections on each of the M video section rows to obtain M×N summation video data; and a second processor circuit for calculating the M×N sampling pixel data corresponding to the respective M×N video sections based on the M×N summation video data.

21. The video filter according to claim 19, wherein each of the pixel data in the first frame data comprises a component corresponding to brightness.

22. The video filter according to claim 19, wherein the video filter is a Gaussian filter.

\* \* \* \* \*

UNITED STATES PATENT AND TRADEMARK OFFICE
Certificate

Patent No. 8,199,257 B2                              Patented: June 12, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Chun-Hung Lien, Taipei (TW); Dong-Yang Lin, Taipei County (TW); and Ching-Hsung Wang, Taipei County (TW)

Signed and Sealed this Nineteenth Day of March 2013.

JEFFEREY F. HAROLD
*Supervisory Patent Examiner*
Art Unit 2422
Technology Center 2400